United States Patent
Lim et al.

(10) Patent No.: US 11,229,296 B2
(45) Date of Patent: Jan. 25, 2022

(54) SEATING SUPPORT DEVICE OF WEARABLE CHAIR

(71) Applicants: Hyundai Motor Company, Seoul (KR); Kia Motors Corporation, Seoul (KR)

(72) Inventors: Hyun Seop Lim, Gyeonggi-do (KR); Dong Jin Hyun, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 100 days.

(21) Appl. No.: 16/693,252

(22) Filed: Nov. 23, 2019

(65) Prior Publication Data
US 2020/0315357 A1   Oct. 8, 2020

(30) Foreign Application Priority Data
Apr. 2, 2019   (KR) .......................... 10-2019-0038529

(51) Int. Cl.
 *A47C 9/10*   (2006.01)
 *A61G 5/14*   (2006.01)
 *B25J 9/00*   (2006.01)

(52) U.S. Cl.
 CPC .............. *A47C 9/10* (2013.01); *A61G 5/14* (2013.01); *B25J 9/0006* (2013.01)

(58) Field of Classification Search
 CPC ............. A47C 9/10; A61G 5/14; B25J 9/0006
 See application file for complete search history.

(56) References Cited

U.S. PATENT DOCUMENTS

| 768,478 A | * | 8/1904 | Nash | A47C 9/10 297/4 |
| 4,138,156 A | * | 2/1979 | Bonner | A47C 9/10 297/4 |
| 4,817,588 A | * | 4/1989 | Bledsoe | A61F 5/0125 602/16 |
| 6,203,511 B1 | * | 3/2001 | Johnson | A61F 5/0125 602/16 |
| 6,960,175 B1 | * | 11/2005 | Myers | A61F 5/0125 602/16 |

(Continued)

FOREIGN PATENT DOCUMENTS

KR   101755806 B1   7/2017

*Primary Examiner* — Timothy J Brindley
(74) *Attorney, Agent, or Firm* — Mintz Levin Cohn Ferris Glovsky and Popeo, P.C.; Peter F. Corless

(57) ABSTRACT

A seating support device of a wearable chair includes a femoral link extending in a direction where a femoral region extends and configured to be connected with the femoral region, a crural link extending in a direction where a crural region extends, and configured to be connected with the crural region, and including a housing that is coupled at an upper end thereof to a lower end of the femoral link to be rotatable relative thereto and a sliding part that is slidably coupled to the housing in a direction in which the housing extends, and a limiting device operated in conjunction with a relative rotation between the femoral link and the crural link to allow the sliding part to slide vertically and to prevent sliding between the sliding part and the housing in a state where an angle between the femoral link and the crural link is a seating angle.

14 Claims, 15 Drawing Sheets

(56) References Cited

U.S. PATENT DOCUMENTS

| | | | |
|---|---|---|---|
| 7,235,059 B2* | 6/2007 | Mason | A61F 5/0125 |
| | | | 128/882 |
| 7,410,471 B1* | 8/2008 | Campbell | A61B 5/6829 |
| | | | 602/16 |
| 2008/0097269 A1* | 4/2008 | Weinberg | A61F 5/0125 |
| | | | 602/16 |
| 2015/0141888 A1* | 5/2015 | Chiang | A61F 5/0123 |
| | | | 602/16 |
| 2015/0306762 A1* | 10/2015 | Doyle | A61H 3/008 |
| | | | 414/7 |
| 2017/0008164 A1* | 1/2017 | Lee | A61H 1/02 |
| 2018/0177670 A1* | 6/2018 | Shim | A63B 21/00181 |
| 2018/0296380 A1* | 10/2018 | Wang | A61F 5/0125 |
| 2018/0338836 A1* | 11/2018 | Fujisawa | A61F 5/02 |
| 2019/0344432 A1* | 11/2019 | Grenier | A45F 3/10 |
| 2020/0046132 A1* | 2/2020 | Gunura | A47C 9/025 |
| 2020/0061803 A1* | 2/2020 | Wang | A61H 1/0237 |
| 2020/0113771 A1* | 4/2020 | Park | A61F 5/0127 |
| 2020/0129367 A1* | 4/2020 | Lee | A61H 1/024 |
| 2020/0155390 A1* | 5/2020 | Bae | A47C 9/025 |
| 2020/0206900 A1* | 7/2020 | Lee | A47C 7/002 |
| 2020/0268584 A1* | 8/2020 | Hsieh | A61H 1/00 |
| 2020/0315358 A1* | 10/2020 | Lim | A47C 9/10 |

* cited by examiner

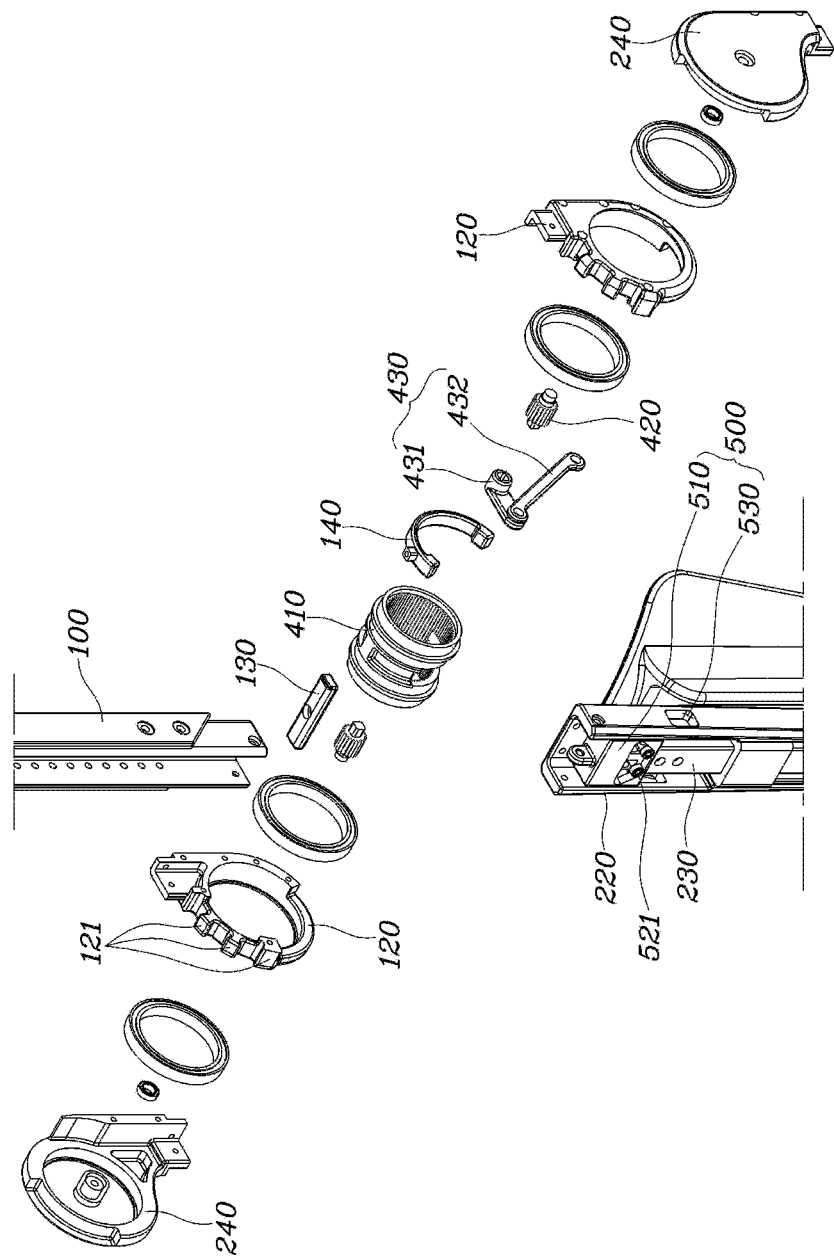

femoral link *(120)* : 0°
rotary ring *(140)* : 0°
internal gear *(410)* : 0°
external gear *(420)* : 0° femoral link (120) : 60°
rotary ring (140) : 60°
internal gear (410) : 0°
external gear (420) : 0° femoral link *(120)* : 80°
rotary ring *(140)* : 80°
internal gear *(410)* : 20°
external gear *(420)* : 60°

SEATING SUPPORT DEVICE OF WEARABLE CHAIR

CROSS REFERENCE TO RELATED APPLICATION

The present application claims under 35 U.S.C. § 119(a) the benefit of Korean Patent Application No. 10-2019-0038529, filed on Apr. 2, 2019 in the Korean Intellectual Property Office, the entire contents of which are incorporated by reference herein.

BACKGROUND

(a) Technical Field

The present disclosure relates to a seating support device of a wearable chair, more particularly, to the seating support device for preventing rotation of a femoral link and a crural link at a seating angle.

(b) Description of the Related Art

Wearable robots having various purposes such as helping workers carry heavy loads at industrial sites, helping disabled, elderly, or infirm persons move by assisting muscular strength, helping patients with a muscular disease for rehabilitation, or helping soldiers carry heavy military gear have been actively developed.

Generally, a wearable robot is made by organically coupling links that act like a person's joints into a shape that is applicable to the human body. Such a wearable robot is applied to a user to support the muscular strength of the upper or lower extremities, thus allowing the user to perform a high-load operation requiring force that is beyond normal muscular strength without the aid of a separate external machine.

However, an active type of wearable robot configured to support the muscular strength by power is problematic in that it is relatively heavy and may have a complicated control mechanism including a controller, and consequently stability may be low and a seating angle is limited.

Further, when a wearer sits, a center of gravity of the wearer deviates from a ground contact point, so that it may be unstable. In addition, when the wearer stands up, fixing of various links of the wearable chair is not released, so that it may interfere with the wearer's walking.

The foregoing is intended merely to aid in the understanding of the background of the present disclosure, and is not intended to mean that the present disclosure falls within the purview of the related art that is already known to those skilled in the art.

SUMMARY

The present disclosure proposes a seating support device for a wearable chair, in which a femoral link and a crural link are fixed to prevent rotation at a seating angle, and fixing of these links is released to allow a wearer's femoral region and crural region to be freely rotated if the femoral link and the crural link are rotated in a direction where they are unfolded when a wearer stands up.

According to one aspect, there is provided a seating support device of a wearable chair including a femoral link extending in a direction where a wearer's femoral region extends, and configured to be connected with the wearer's femoral region; a crural link extending in a direction where a wearer's crural region extends, and configured to be connected with the wearer's crural region, and including a housing that is coupled at an upper end thereof to a lower end of the femoral link to be rotatable relative thereto, and a sliding part that is slidably coupled to the housing in a direction in which the housing extends; and a limiting device operated in conjunction with a relative rotation between the femoral link and the crural link to allow the sliding part sliding in the housing to slide up and down, and to prevent sliding between the sliding part and the housing in a state where an angle between the femoral link and the crural link is a seating angle.

The support device may further include a stopper engaging with the lower end of the femoral link to rotate integrally with the femoral link; and a rotation preventing protrusion provided on the upper end of the crural link to prevent the stopper from being rotated such that an angle between the femoral link and the crural link is less than the seating angle.

Coupling protrusions may be formed on the lower end of the femoral link to protrude outwardly at a plurality of angular points in a direction where the femoral link may be rotated relative to the crural link, and the stopper may engage with an associated coupling protrusion to rotate integrally with the femoral link, and may change the seating angle depending on an angular point of the coupling protrusion engaging with the stopper.

The support device may further include a rotary ring coupled to the lower end of the femoral link to be rotatable relative to the femoral link, and coupled with the sliding part to slide the sliding part as the rotary ring rotates; and a stopper coupled integrally with the rotary ring, and engaging with the lower end of the femoral link to rotate integrally with the rotary ring and the femoral link.

Coupling protrusions may be formed on the lower end of the femoral link to protrude outwardly at a plurality of angular points in a direction where the femoral link may be rotated relative to the crural link, and the rotary ring may be detachably coupled with the stopper, the stopper may engages with the coupling protrusion when being integrally coupled with the rotary ring to rotate integrally with the femoral link, and the rotary ring may be rotated relative to the femoral link depending on an angular point of the coupling protrusion with which the stopper engages, thus changing the seating angle.

The limiting device may include through holes formed on both sides of the housing surrounding both sides of the sliding part; and fixing bodies moved integrally in a sliding direction of the sliding part, and coupled slidably to both sides of the sliding part in the sliding part, wherein the fixing bodies may slide to both sides of the sliding part to be inserted into the through holes, thus preventing the sliding part from sliding.

The limiting device may further include a cam device positioned above the sliding part, coupled slidably with the sliding part in the sliding direction of the sliding part, and connected to be linearly moved by a rotating motion of the rotary ring, and the fixing bodies may include guide protrusions protruding in a direction perpendicular to the sliding direction of the fixing bodies, and the cam device may include a cam hole to allow the guide protrusions of the fixing bodies to slide a predetermined distance in a vertical direction while being inserted therein, and the cam hole may be formed to allow the guide protrusions to come closer to each other if the guide protrusions of the fixing bodies slide downwards.

The support device may further include a transmission link connected at a first end thereof to be associated with the relative rotation between the femoral link and the crural link, and connected at a second end thereof to the sliding part, thus converting a rotating motion associated with the relative rotation between the femoral link and the crural link into a linear motion of the sliding part.

The support device may further include a rotary ring fixed to the lower end of the femoral link to be rotatable integrally with the femoral link; an internal gear having on an inner circumference thereof inner teeth, and coupled at a portion or a whole portion thereof with the rotary ring to be rotatable integrally with the rotary ring; and an external gear having on an outer circumference thereof outer teeth to mesh with the inner teeth of the internal gear, and coupled to the transmission link to slide the sliding part as the external gear rotates.

The support device may further include a contact link coupled at a first end thereof to the lower end of the crural link to be rotatable relative thereto, and operated in conjunction with the sliding of the sliding part associated with the relative rotation between the femoral link and the crural link to be rotated about the first end, a second end coming into contact with a ground while being spaced apart from the crural link when a wearer wears the device.

The first end of the contact link may be rotatably coupled to the lower end of the housing, and the support device may further include a connection link rotatably coupled at a first end thereof to the sliding part, and coupled at a second end thereof to a position spaced apart from the first end of the contact link coupled to the lower end of the housing, and rotating the contact link by the sliding of the sliding part.

The contact link may be rotated in conjunction with the relative rotation between the femoral link and the crural link in a rotating section where an angle between the femoral link and the crural link may be between a pressing angle obtained by adding the seating angle to a preset interlocking angle and the seating angle, and may be fixed in a free section where the angle between the femoral link and the crural link may be equal to or more than the pressing angle.

The support device may further include a rotary ring fixed to the lower end of the femoral link to be rotatable integrally with the femoral link; an internal gear having on an inner circumference thereof inner teeth, and coupled with the rotary ring in the free section of the femoral link and the crural link to be freely rotated relative thereto, and engaging with the rotary ring in the rotating section of the femoral link and the crural link to be rotated integrally therewith; and an external gear having on an outer circumference thereof outer teeth to mesh with the inner teeth of the internal gear, and coupled with the contact link to be rotated in conjunction with the contact link.

A number of teeth of the external gear may be smaller than a number of teeth of the internal gear to accelerate the rotation of the internal gear.

BRIEF DESCRIPTION OF THE DRAWINGS

The above and other objects, features and other advantages of the present disclosure will be more clearly understood from the following detailed description when taken in conjunction with the accompanying drawings, in which:

FIG. 2 is an exploded view illustrating components between a lower end of a femoral link and an upper end of a crural link according to the embodiment of the present disclosure;

DETAILED DESCRIPTION OF THE DISCLOSURE

Figure 1:
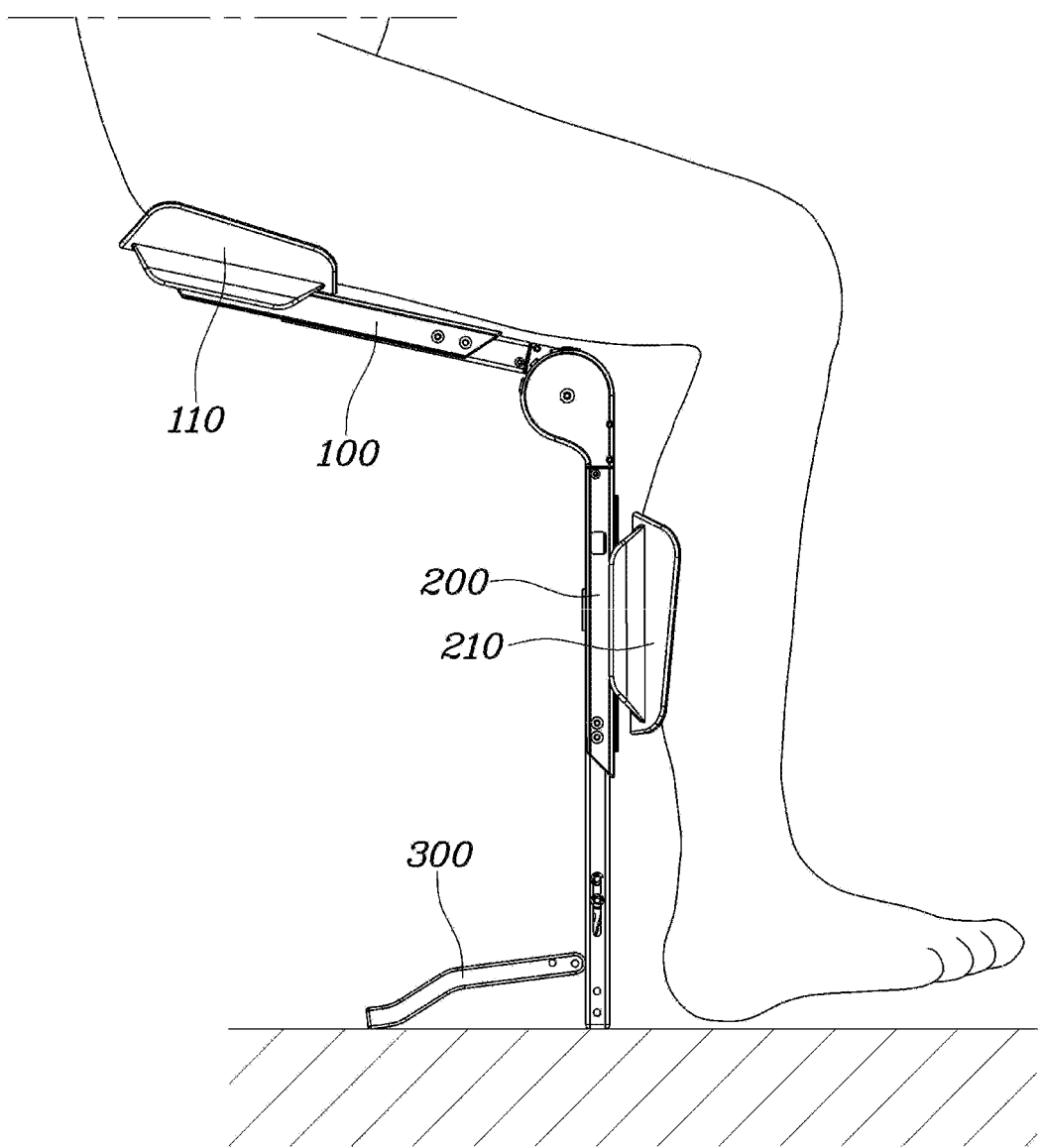
FIG. 1 is a side view illustrating the state in which a wearer wears a wearable chair according to an embodiment of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Although the disclosure will be described in its preferred form with a certain degree of particularity, it is to be understood that the present embodiment is illustrative and various changes and modifications may be made in the disclosure without being limited to specific embodiments.

Since the present disclosure will be changed in various ways and have various embodiments, particular embodiments will be illustrated in the accompanying drawings and described in detail in the following description. However, it is to be understood that the present disclosure is not limited to any particular embodiment and embraces all changes, substitutes or equivalence without departing from the spirit or scope of the present disclosure.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure.

When the term "couple" or "connect" is used in the following description, it is intended to mean not only "directly coupled or connected to" but also "indirectly coupled or connected to" such as connected through another intervening element. However, when the expression "directly coupled" or "directly connected" is used herein, it is to be understood that there is no intervening component. The same applies to other expressions illustrating the relationship between components, namely, "between", "directly between", "adjacent to", "directly adjacent to" or the like.

Unless otherwise defined, all terms including technical or scientific terms have the same meaning as commonly understood by those skilled in the art. Terms defined in a common dictionary should be construed as meaning consistent with meaning in the context of the related art, and should not be construed as being ideally or excessively formal meaning unless expressly defined otherwise.

Hereinafter, the preferred embodiment of the present disclosure will be described in detail with reference to the accompanying drawings. The same reference numerals denote the same components throughout the drawings.

Figure 3A:
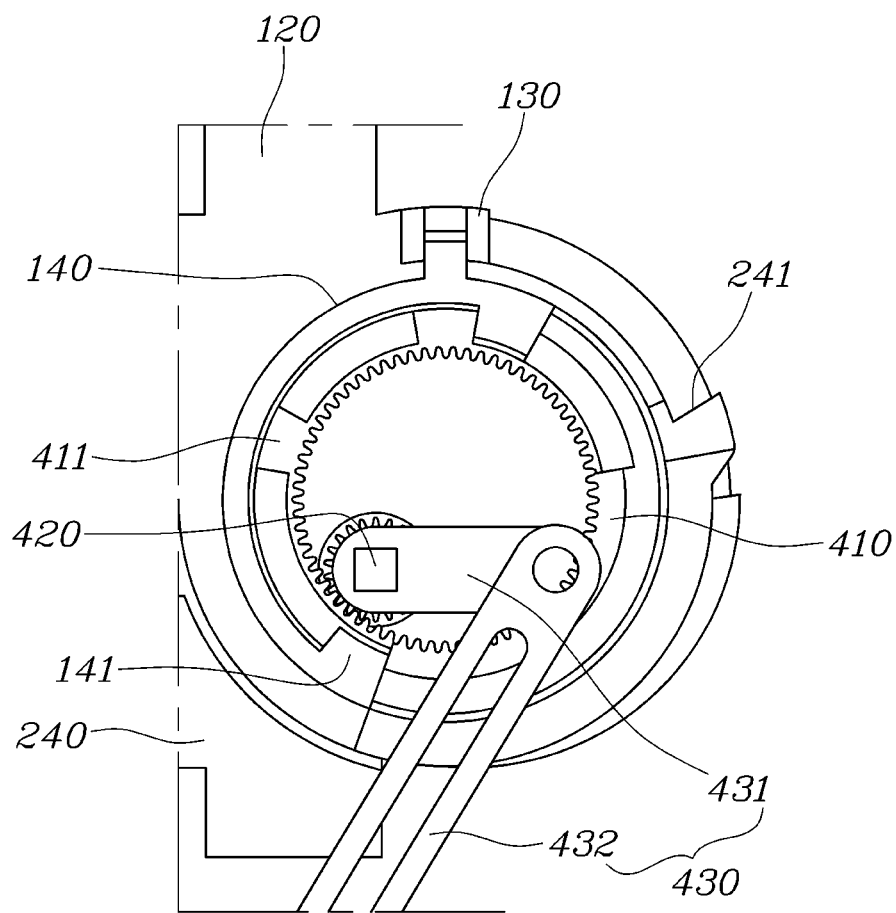
FIGS. 3A to 3C illustrate sliding of a sliding part caused by a relative rotation between the femoral link and the crural link.
Figure 3B:
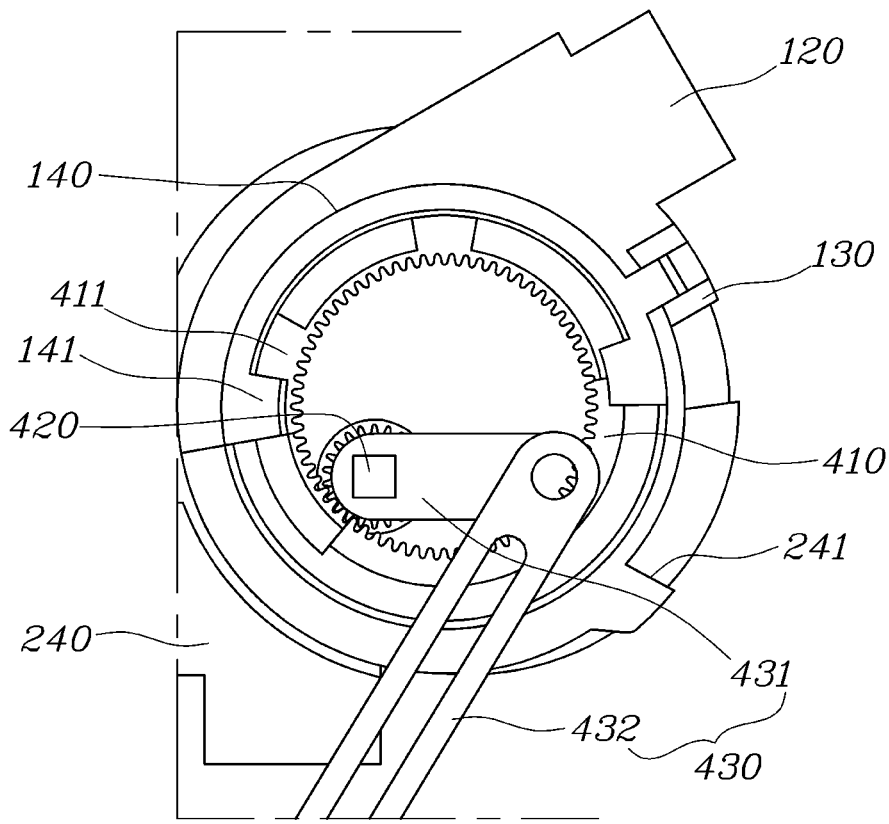
Figure 3C:
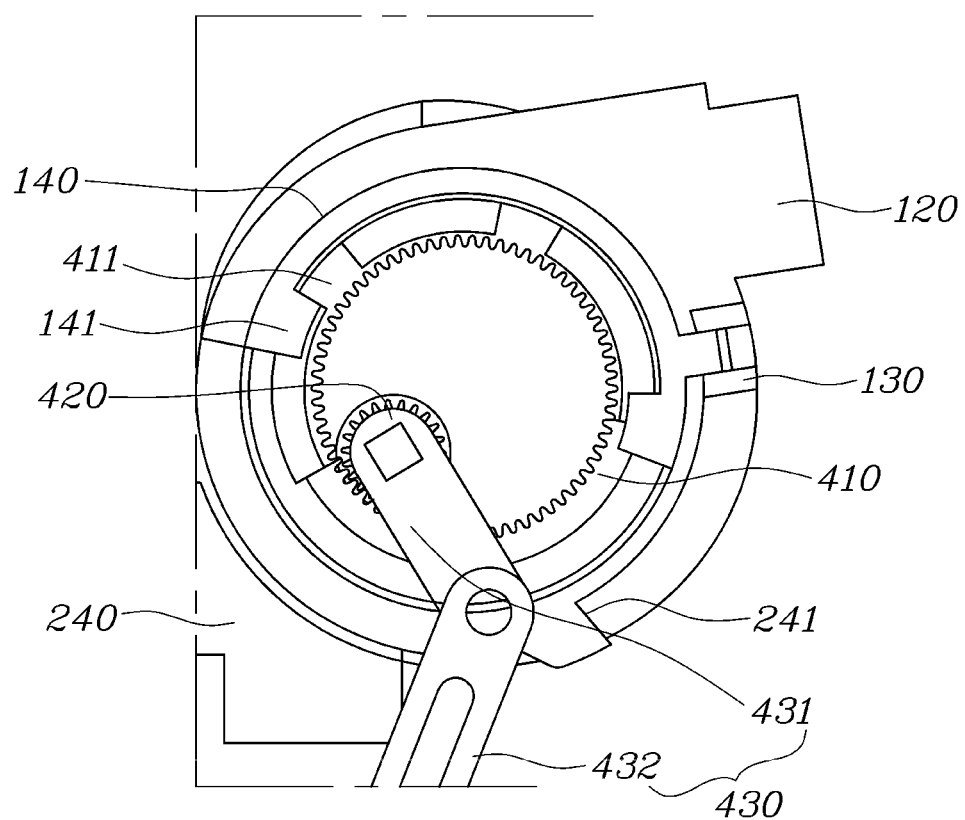

FIG. 1 is a side view illustrating the state in which a wearer wears a wearable chair according to an embodiment of the present disclosure, and FIG. 2 is an exploded view illustrating components between a lower end of a femoral link and an upper end of a crural link according to the embodiment of the present disclosure. FIGS. 3A to 3C illustrate the sliding of a sliding part caused by a relative rotation between the femoral link and the crural link.

Referring to FIGS. 1 and 3A-3C, a seating support device of a wearable chair includes a femoral link 100 extending in a direction where a wearer's femoral region extends and configured to be connected with the wearer's femoral region, a crural link 200 extending in a direction where a wearer's crural region extends and configured to be connected with the wearer's crural region, and including a housing 220 that is coupled at an upper end thereof to a lower end of the femoral link 100 to be rotatable relative thereto, and a sliding part 230 that is slidably coupled to the housing 220 in a direction in which the housing 220 extends, and a limiting device 500 operated in conjunction with a relative rotation between the femoral link 100 and the crural link 200 to allow the sliding part 230 sliding in the housing 220 to slide up and down, and to prevent sliding between the sliding part 230 and the housing 220 in a state where an angle between the femoral link 100 and the crural link 200 is a seating angle.

The femoral link 100 may extend in a direction where the femoral region extends, to correspond to the wearer's femoral region. A femoral fixing part 110 coupled to come into contact with the wearer's femoral region may be further coupled to the femoral link 100. Further, the femoral fixing part 110 may be fixed to the wearer's femoral region through a separate harness (not shown).

The crural link 200 is coupled at its upper end to the lower end of the femoral link 100 to be rotatable relative thereto, thus simulating a wearer's knee joint. That is, at his or her knee joint, the upper end 240 of the crural link 200 may be coupled to the lower end of the femoral link 100 to be rotatable relative thereto.

Particularly, when the angle between the crural link 200 and the femoral link 100 is larger than the seating angle, a relative rotation is possible. The relative rotation is prevented at the seating angle. Consequently, the crural link and the femoral link may be prevented from being rotated below the seating angle.

The housing 220 may be formed to surround the interior of the sliding part 230, and the upper end of the housing 220 may be coupled to the lower end of the femoral link 100 to be rotated relative thereto. The housing 220 may be slidably coupled with a crural fixing part 210. When the wearer sits, the lower end of the housing may be in contact with the ground.

The sliding part 230 may be coupled in the housing 220 to be slidable in the extension direction of the housing 220, and may slide relative to the housing 220 in conjunction with the relative rotation between the femoral link 100 and the crural link 200 to be connected to a contact link 300 and thereby rotate the contact link 300.

In the state where the angle between the femoral link 100 and the crural link 200 is the seating angle, the limiting device 500 may prevent sliding between the sliding part 230 and the housing 220. Particularly, at a point where the angle between the femoral link 100 and the crural link 200 is the seating angle, the sliding part 230 may be fixed to the housing 220 to prevent the sliding. Thus, the sliding of the sliding part 230 may be fixed at the seating angle, so that the angle between the femoral link 100 and the crural link 200 may be fixed to the seating angle.

The contact link 300 may be rotatably coupled at one end thereof to the lower end of the crural link 200, so that the contact link 300 may be rotated about the end coupled to the lower end of the crural link 200 as a rotation axis. Particularly, the contact link 300 may be rotated in conjunction with the relative rotation between the femoral link 100 and the crural link 200, and the other end of the contact link 300 may come into contact with the ground while being spaced apart from the crural link 200 when the wearer wears the device.

Accordingly, when the wearer wears the device, the center of gravity is stably supported by the contact link 300 that is positioned behind a wearer's heel to be spaced apart therefrom and comes into contact with the ground.

The device may further include the crural fixing part 210 that is coupled to the wearer's crural region while being in contact therewith, and is coupled to the crural link 200 to be slidable in the extension direction of the crural link 200. The crural fixing part 210 may be coupled to the wearer's crural region via a separate harness (not shown), and may be fixed to the wearer's crural region to slide relative to the crural link 200.

Thus, as the wearer stands up or sits, the crural link 200 slides up and down in the wearer's crural region, thus simulating the wearer's knee bending joint at a position spaced apart from the wearer's knee joint and compensating for the movement of the crural link 200. That is, when the wearer sits, the crural link 200 may slide downwards. Meanwhile, when the wearer stands up, the crural link may slide upwards again.

Particularly, when the wearer sits, the crural link 200 may slide downwards with respect to the crural fixing part 210, the lower end of the crural link 200 may come into contact with the ground.

That is, when the wearer sits, in the state where the crural fixing part 210 is fixed to the wearer's crural region, the crural link 200 may slide downwards, so that the lower end of the crural link may come into contact with the ground. Thus, when the wearer sits, both the lower end of the crural link 200 and the other end of the contact link 300 come into contact with the ground, thus stably supporting the wearer's load.

Further, when the wearer stands up, the crural fixing part 210 may slide upwards again to make the lower end be spaced apart from the ground. Therefore, this does not interfere with the wearer's walking, thus enabling free walking.

The device may further include a transmission link 430 that is connected at one end thereof to be associated with the relative rotation between the femoral link 100 and the crural link 200 and is connected at the other end thereof to the sliding part 230, thus converting a rotating motion associated with the relative rotation between the femoral link 100 and the crural link 200 into a linear motion of the sliding part 230.

In particular, the transmission link 430 may be configured to convert the rotating motion into the linear motion like a crank device. The transmission link 430 is coupled at one end thereof to the external gear 420 to be rotated by the rotation of the external gear 420, while the transmission link 430 is coupled at the other end thereof to a cam device 510, which will be described below, to slide the sliding part 230.

Particularly, the transmission link 430 may include a first link 431 that is coupled to be rotated integrally with the external gear 420, and a second link 432 that is rotatably coupled to the first link 431 to be coupled to the cam device 510.

The device may further include a rotary ring 140 that is fixed to the lower end of the femoral link 100 to be rotatable integrally with the femoral link 100, an internal gear 410 that has on an inner circumference thereof inner teeth and is coupled at a portion or a whole portion thereof with the rotary ring 140 to be rotatable integrally with the rotary ring, and an external gear 420 that has on an outer circumference thereof outer teeth to mesh with the inner teeth of the internal gear 410 and is coupled to the transmission link 430 to slide the sliding part 230 as the external gear rotates.

Particularly, the device may further include a stopper 130 that engages with the lower end of the femoral link 100 to rotate integrally with the femoral link 100. The rotary ring 140 may be coupled to the lower end of the femoral link 100 to be rotatable relative to the femoral link 100. If the stopper 130 is coupled to the rotary ring 140, the stopper 130 engages with the coupling protrusion 121 formed on the lower end of the femoral link 100, thus allowing the rotary ring 140 to be rotated integrally with the femoral link 100. That is, when the rotary ring 140 is coupled with the stopper 130, the rotary ring 140 may be rotated integrally with the femoral link 100.

As the rotary ring 140 rotates, it may be coupled with the sliding part 230 to slide the sliding part 230. Thus, the sliding part 230 may slide in the housing 220 in conjunction with the relative rotation between the femoral link 100 and the crural link 200.

The device may further include the rotary ring 140 that is coupled to the lower end of the femoral link 100 to be rotatable relative to the femoral link 100 and is coupled with the sliding part 230 to slide the sliding part 230 as the rotary ring rotates, and the stopper 130 that is coupled integrally with the rotary ring 140 and engages with the lower end of the femoral link 100 to rotate integrally with the rotary ring 140 and the femoral link 100.

Coupling protrusions 121 are formed on the lower end of the femoral link 100 to protrude outwardly at a plurality of angular points in a direction where the femoral link is rotated relative to the crural link 200. The rotary ring 140 is detachably coupled with the stopper 130. When the stopper 130 is integrally coupled with the rotary rig 140, the stopper engages with each of the coupling protrusions 121 to rotate integrally with the femoral link 100. The rotary rig 140 is rotated relative to the femoral link 100 depending on the angular point of the coupling protrusion 121 with which the stopper 130 engages, thus changing the seating angle.

The rotary ring 140 is detachably coupled with the stopper 130. If the rotary ring 140 is separated from the stopper 130, the rotary ring may be rotated relative to the femoral link 100. In the state where the stopper 130 is separated from the rotary ring 140, the angular point of the coupling protrusion 121 engaging with the stopper 130 is changed and then the stopper 130 is coupled with the rotary ring 140, so that the rotary ring 140 may be coupled to be rotated integrally with the femoral link 100 while being rotated relative to the femoral link 100. Thus, it is possible to easily change the seating angle by the separation of the rotary ring 140 from the stopper 130 and the re-coupling of the rotary ring with the stopper while being rotated relative to the femoral link 100.

That is, after the stopper 130 and the rotary ring 140 are separated from each other, they are re-coupled with each other while being rotated relative to the femoral link 100, so that the seating angle of the femoral link 100 and the crural link 200 at which the rotation of the stopper 130 is prevented by the rotation preventing protrusion 241 and the sliding of the sliding part 230 is fixed by the rotary ring 140 may be changed.

Referring to FIG. 1 and FIGS. 3A to 3C, the contact link 300 is rotated in conjunction with the relative rotation between the femoral link 100 and the crural link 200 in a rotating section where an angle between the femoral link 100 and the crural link 200 is between a pressing angle obtained by adding the seating angle to a preset interlocking angle and the seating angle, and is fixed in a free section where the angle between the femoral link 100 and the crural link 200 is equal to or more than the pressing angle.

FIGS. 3A to 3C illustrate the relative rotation between the femoral link 100 and the crural link 200 in a state where the seating angle is set to 100 degrees, the preset interlocking angle is set to 20 degrees, and thereby the pressing angle is set to 120 degrees, for example.

Even if the femoral link 100 and the rotary ring 140 are rotated by 60 degrees so that the angle between the femoral link 100 and the crural link 200 is changed from 180 degrees to 120 degrees and thereby the device is changed from a position of FIG. 3A to a position of FIG. 3B, the internal gear 410 and the external gear 420 that will be described below never rotate. That is, in the free section where the angle between the femoral link 100 and the crural link 200 is above the pressing angle, the femoral link 100 and the rotary ring 140 may be integrally rotated freely.

But, in a section where the femoral link 100 and the rotary ring 140 are further rotated by 20 degrees so that the angle between the femoral link 100 and the crural link 200 is changed from 120 degrees to 100 degrees and thereby the device is changed from a position of FIG. 3B to a position of FIG. 3C, the internal gear 410 and the external gear 420 are rotated together. That is, in a rotating section where the angle between the femoral link 100 and the crural link 200 is between pressing angle and the seating angle, the contact link 300 may be rotated in conjunction with the relative rotation between the femoral link 100 and the crural link 200.

The device may include the rotary ring 140 that is fixed to the lower end of the femoral link 100 to be rotatable integrally with the femoral link 100, an internal gear 410 that has on an inner circumference thereof inner teeth, is coupled with the rotary ring 140 in the free section of the femoral link 100 and the crural link 200 to be freely rotated relative thereto, and engages with the rotary ring 140 in the rotating section of the femoral link 100 and the crural link 200 to be rotated integrally therewith, and an external gear 420 that has on an outer circumference thereof outer teeth to mesh with the inner teeth of the internal gear 410 and is coupled with the contact link 300 to be rotated in conjunction with the contact link 300.

When the rotary ring 140 is coupled with the stopper 130, the stopper 130 engages with the femoral link 100, so that the rotary ring may be rotated integrally with the femoral link 100. The rotary ring 140 may be formed outside the internal gear 410 to surround a portion of the outer circumference of the internal gear 410, with a locking protrusion 141 being formed on the rotary ring to protrude inwards.

The internal gear 410 may have on the inner circumference thereof the inner teeth, and a portion of the outer circumference of the internal gear may be surrounded by the rotary ring 140. The internal gear 410 may be coupled to freely perform a relative rotation in the free section of the femoral link 100 and the crural link 200, and may engage with the rotary ring 140 in the rotating section of the femoral link 100 and the crural link 200.

Particularly, a fixing protrusion 411 may be formed on the outer circumference of the internal gear 410 to engage with the locking protrusion 141 of the rotary ring 140 in the rotating section of the femoral link 100 and the crural link 200. The locking protrusion 141 of the rotary ring 140 and the fixing protrusion 411 of the internal gear 410 engage with each other in the rotating section of the femoral link 100 and the crural link 200, so that the rotary ring 140 and the internal gear 410 are integrally rotated. In the free section of the femoral link 100 and the crural link 200, the rotary ring and the internal gear are not interfered with each other, so that the rotary ring 140 and the internal gear 410 may be freely rotated relative to each other.

The outer teeth formed on the outer circumference of the external gear 420 may mesh with the inner teeth of the internal gear 410, and may be rotated by the rotation of the internal gear 410. Particularly, the external gear may be connected to the contact link 300 to be rotated in conjunction with the contact link 300. That is, if the external gear 420 is rotated, the contact link 300 may also be rotated.

Particularly, the number of teeth of the external gear 420 may be smaller than the number of teeth of the internal gear 410 to accelerate the rotation of the internal gear 410. As illustrated in the drawing, while the internal gear 410 rotates at 20 degrees, the external gear 420 may be accelerated to rotate at 60 degrees.

Thus, the preset rotating section of the femoral link 100 and the crural link 200 is relatively reduced, thus allowing the contact 300 to protrude only at an adjacent angle when the wearer sits, and allowing the wearer to freely walk without interference when the wearer walks.

Figure 4A:
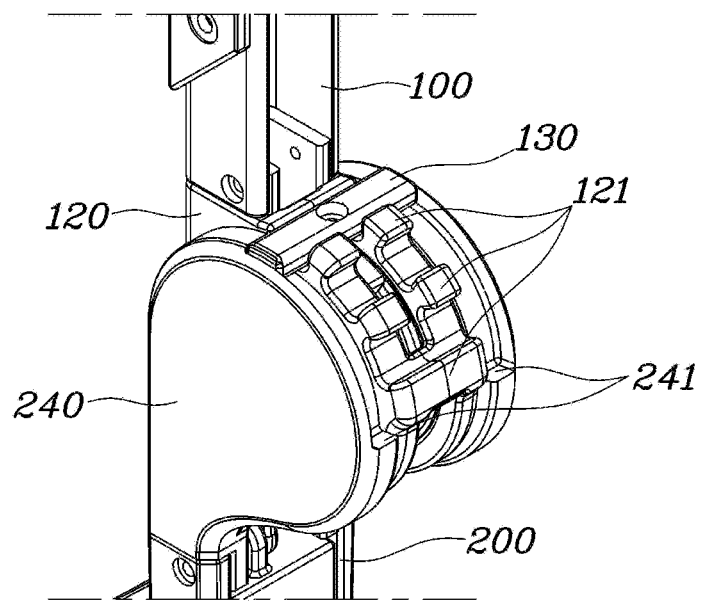
FIGS. 4A to 4C illustrate the state in which the wearable chair according to the embodiment of the present disclosure is changed at various seating angles.
Figure 4B:
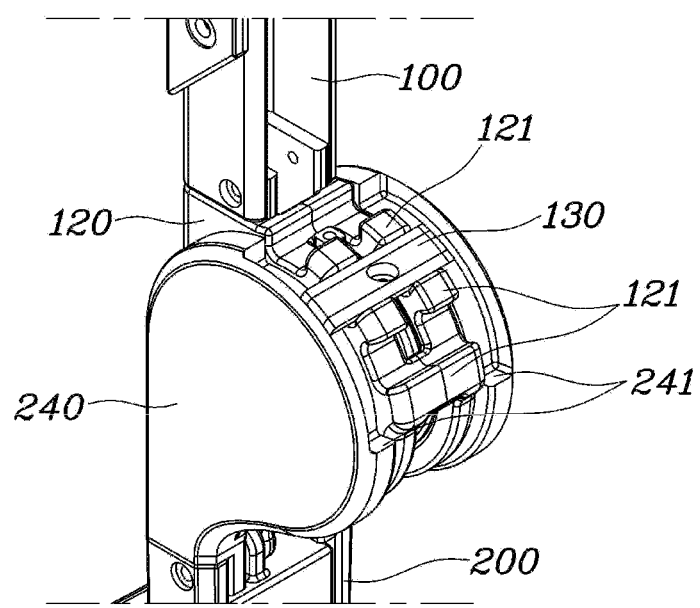
Figure 4C:
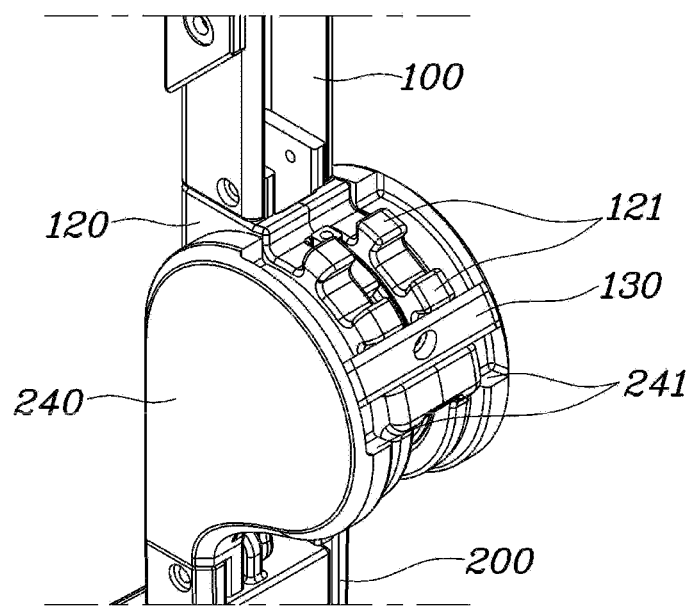

FIGS. 4A to 4C illustrate the state in which the wearable chair according to the embodiment of the present disclosure is changed at various seating angles.

Referring to FIGS. 4A to 4C, the device may further the stopper 130 that engages with the lower end of the femoral link 100 to rotate integrally with the femoral link 100, and the rotation preventing protrusion 241 that is provided on the upper end 240 of the crural link 200 to prevent the stopper 130 from being rotated such that an angle between the femoral link 100 and the crural link 200 is less than the seating angle.

The stopper 130 may engage with the lower end of the femoral link 100 to rotate along with the femoral link 100, and the femoral link 100 and the crural link 200 may rotate relative to each other above the seating angle. But, the rotation preventing protrusion 241 engaging with the stopper 130 to prevent the stopper 130 from being rotated at the seating angle may be formed on the upper end 240 of the crural link 200 to prevent the femoral link 100 from being rotated any more.

That is, apart from the limiting device 500 for preventing the sliding part 230 from sliding, the rotation preventing protrusion 241 for preventing the rotation of the stopper 130 may be further formed on the crural link 200, thus more stably preventing the femoral link 100 and the crural link 200 from being rotated relative to each other at the seating angle.

Further, the coupling protrusions 121 are formed on the lower end of the femoral link 100 to protrude outwardly at a plurality of angular points in a direction where the femoral link is rotated relative to the crural link 200, and the stopper 130 engages with each of the coupling protrusions 121 to rotate integrally with the femoral link 100, and the seating angle is changed depending on the angular point of the coupling protrusion 121 engaging with the stopper 130.

The coupling protrusions 121 protrude outwardly from the lower end of the femoral link 100 to engage with the stopper 130. Thus, the stopper 130 and the femoral link 100 may be integrally rotated. Particularly, the coupling protrusions 121 may be formed at a plurality of angular points in a direction where they are rotated relative to the upper end 240 of the crural link 200.

The stopper 130 may engage with one of the coupling protrusions 121 formed at a plurality of angular points. That is, the stopper 130 is detachably coupled to the femoral link 100, so that the stopper engages with the coupling protrusion 121 to be rotated integrally with the femoral link 100 at any one of the angular points, thus allowing the seating angle to be changed.

The seating angle may be set such that the angle between the femoral link 100 and the crural link 200 is, for example, 100 degrees (FIG. 4A), 120 degrees (FIG. 4B), 140 degrees (FIG. 4C) and the like. That is, the coupling protrusions 121 are formed such that the stopper 130 is fixed at an angular interval of 20 degrees. Thus, when the femoral link 100 and the crural link 200 are rotated at the angles of 80 degrees, 60 degrees and 40 degrees from a completely unfolded position to a folded position, the rotation of the stopper 130 may be prevented by the rotation preventing protrusion 241.

Figure 5A:
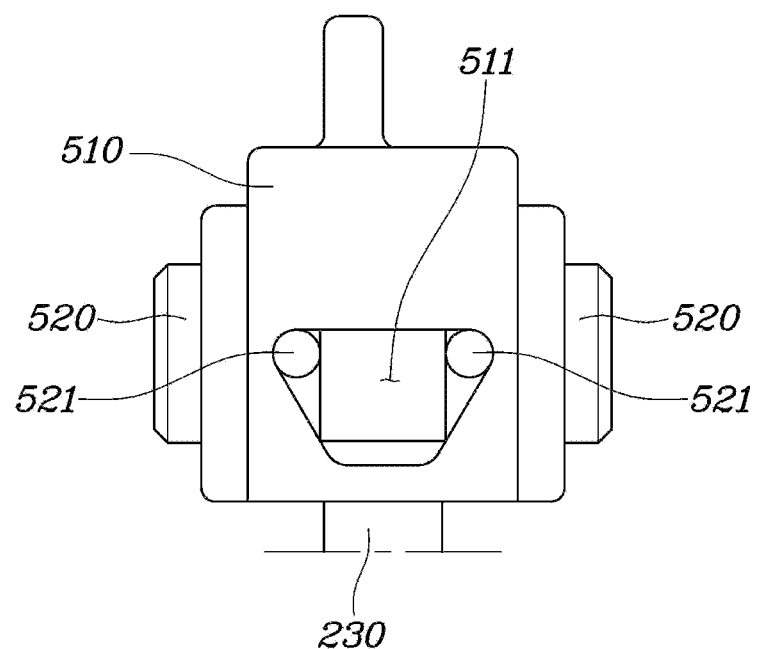
FIGS. 5A and 5B illustrate a sliding blocking mechanism of a limiting device.
Figure 5B:
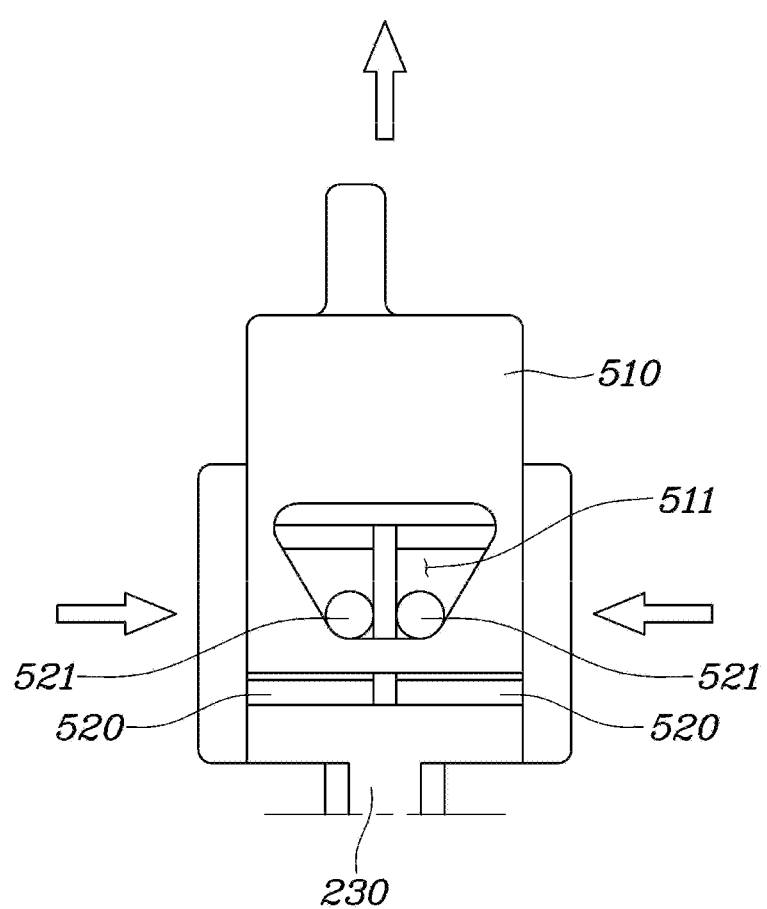

FIGS. 5A and 5B illustrate the sliding blocking mechanism of the limiting device 500.

Referring to FIGS. 5A and 5B, the limiting device 500 includes through holes 530 that are formed on both sides of the housing 220 surrounding both sides of the sliding part 230, and fixing bodies 520 that are moved integrally in the sliding direction of the sliding part 230 and are slidably coupled to both sides of the sliding part 230 in the sliding part 230. The fixing bodies 520 slide to both sides of the sliding part 230 to be inserted into the through holes 530, thus preventing the sliding part 230 from sliding.

The fixing bodies 520 may be slidably coupled to both sides of the sliding part 230, and may be coupled to move integrally with the vertical sliding of the sliding part 230. The through holes 530 may be formed in both sides of the housing 220 to allow the fixing bodies 520 to be inserted into or pass through both sides of the housing 220.

Particularly, in order to insert the fixing body 520 into the through hole 530 in the state where the angle between the femoral link 100 and the crural link 200 is the seating angle, the through hole may be formed at a position of the fixing body 520 in the state where the angle between the femoral link 100 and the crural link 200 is the seating angle.

Thus, in the state where the angle between the femoral link 100 and the crural link 200 is the seating angle, the fixing body 520 is inserted into the through hole 530 to prevent the sliding of the housing 220 and the sliding part 230 and thereby fix the angle between the femoral link 100 and the crural link 200.

The limiting device 500 further includes a cam device 510 that is positioned above the sliding part 230, is slidably coupled with the sliding part 230 in the sliding direction of the sliding part 230, and is connected to be linearly moved by a rotating motion of the rotary ring 140. The fixing bodies 520 include guide protrusions 521 that protrude in a direction perpendicular to the sliding direction of the fixing bodies 520, respectively. The cam device 510 includes a cam hole 511 to allow the guide protrusions 521 of the fixing bodies 520 to slidably move a predetermined distance in a vertical direction while being inserted therein. The cam hole 511 is formed to allow the guide protrusions to come closer to each other if the guide protrusions 521 of the fixing bodies 520 slide downwards.

The cam device 510 may be located above the sliding part 230 and be coupled with the sliding part 230 to slide the sliding part a predetermined distance. The cam device 510 is rotatably coupled with the transmission link 430, so that the cam device is pulled upward or pushed downwards by the rotation of the transmission link 430 as the external gear 420 rotates.

The guide protrusion 521 of the fixing body 520 may protrude in the sliding direction of the fixing body 520 and in a direction perpendicular to the sliding direction of the sliding part 230.

The cam hole 511 may be formed in the cam device 510 to guide the sliding of the guide protrusion 521 while the guide protrusion 521 of the fixing body 520 being inserted therein. The cam hole 511 may be tapered downwards while having a predetermined distance in a vertical direction.

Thus, if the cam device 510 is pulled upwards by the transmission link 430, the cam device 510 slides upwards with respect to the fixing body 520 and the sliding part 230. As the cam device 510 moves upwards, the guide protrusions 521 of the fixing bodies 520 are located at a lower position of the cam hole 511 and slide to come closer to each other. Thus, if the wearer stands up, the fixing bodies 520 are automatically removed from the through holes 530 to release the fixing of the sliding part 230.

In contrast, if the cam device 510 is pushed downwards by the transmission link 430, the cam device 510 slides downwards with respect to the fixing bodies 520 and the sliding part 230. As the cam device 510 moves downwards, the guide protrusions 521 of the fixing bodies 520 are subjected to a force for making them move apart from each other while moving upwards in the cam hole 511. Thus, if the angle between the femoral link 100 and the crural link 200 becomes the seating angle when the wearer sits, the fixing bodies 520 move apart from each other to be inserted into or pass through the through holes 530.

Thus, when standing up again at the seating angle, the fixing of the sliding part 230 is released without the necessity of pressing both the fixing bodies 520. When sitting at the seating angle, the sliding of the sliding part 230 is automatically fixed.

In addition, the device may further include a second elastic body (not shown) to apply an elastic force to each of the fixing bodies 520 in the direction where both the fixing bodies 520 move to both sides to be spaced apart from each other.

Figure 6A:
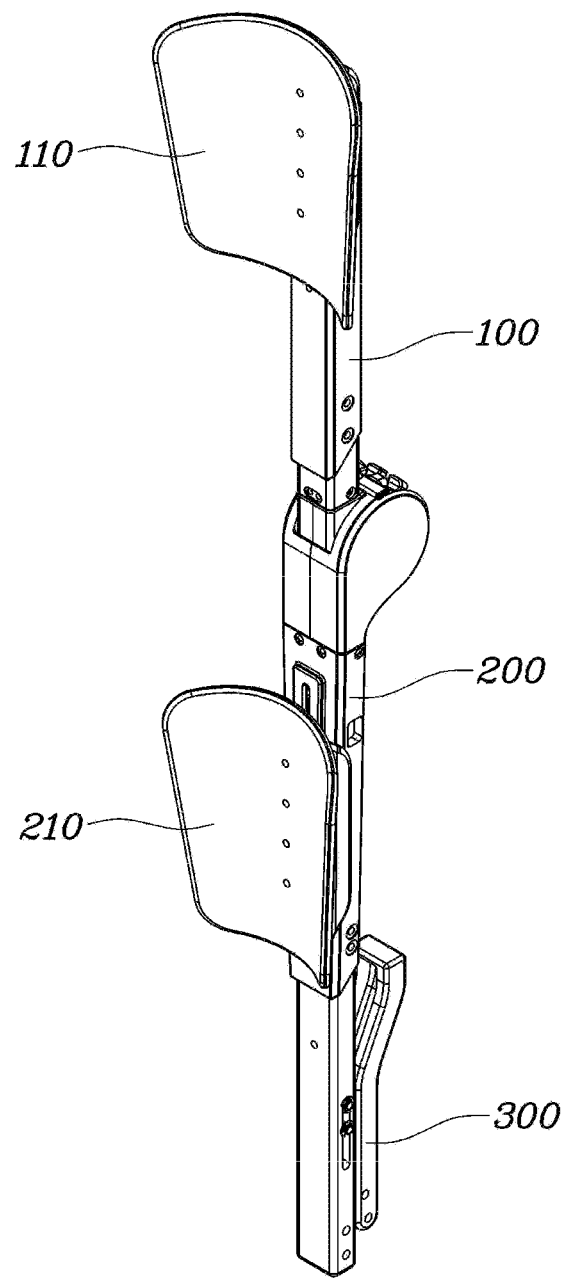
FIGS. 6A and 6B are perspective views illustrating the state in which the wearable chair according to the embodiment of the present disclosure is unfolded.
Figure 6B:
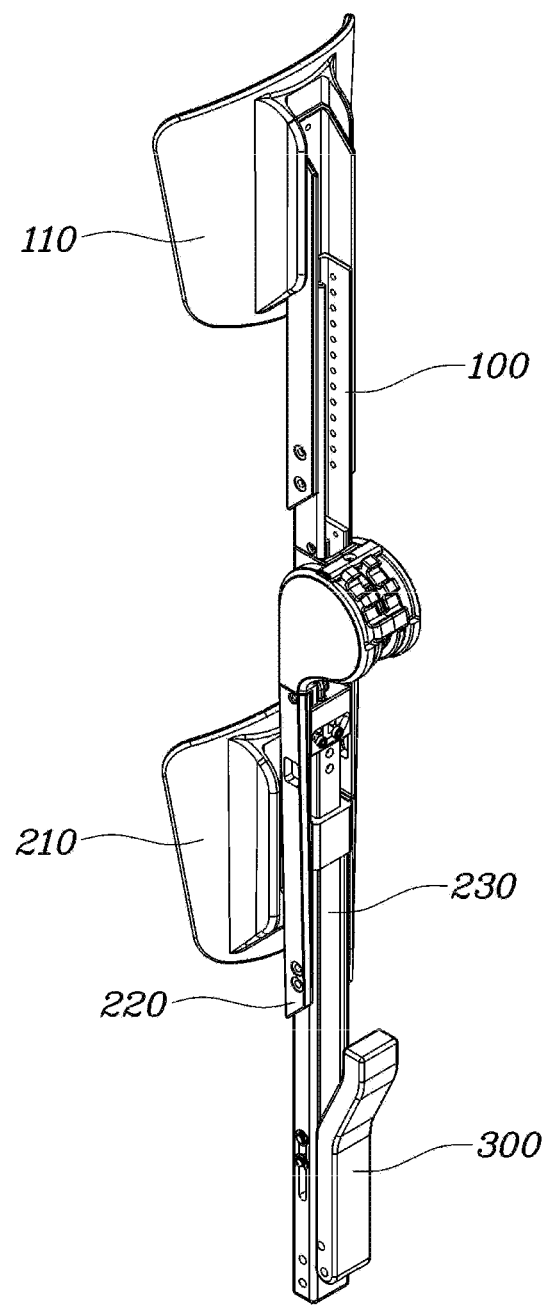
Figure 7A:
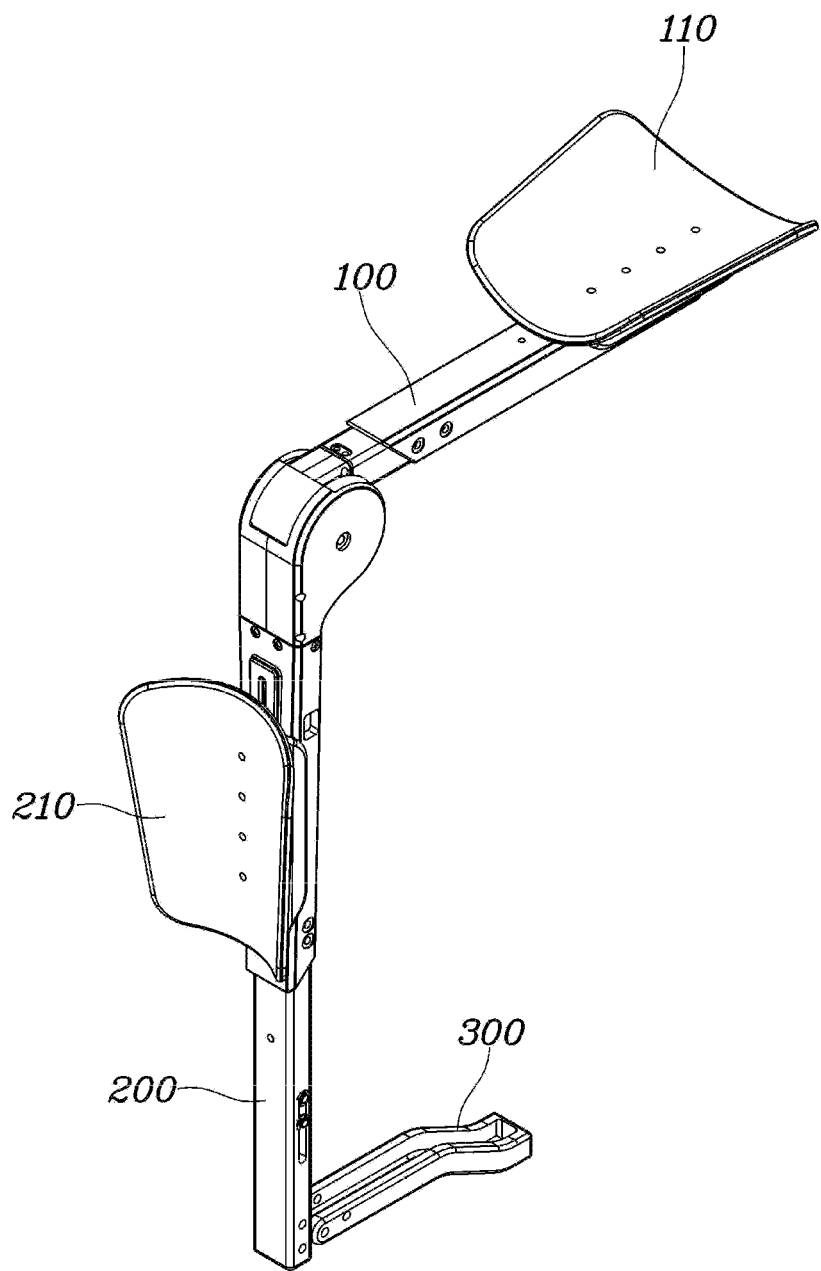
FIGS. 7A and 7B are perspective views illustrating the state in which the wearable chair according to the embodiment of the present disclosure is folded at a seating angle.
Figure 7B:
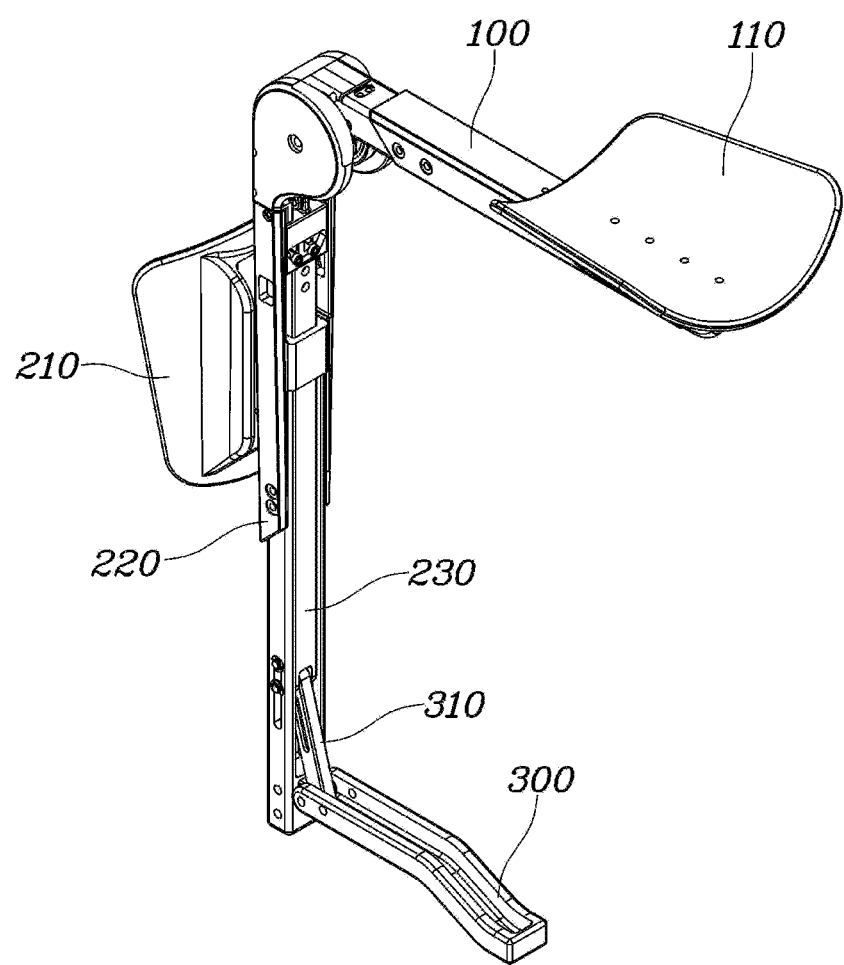
Figure 8:
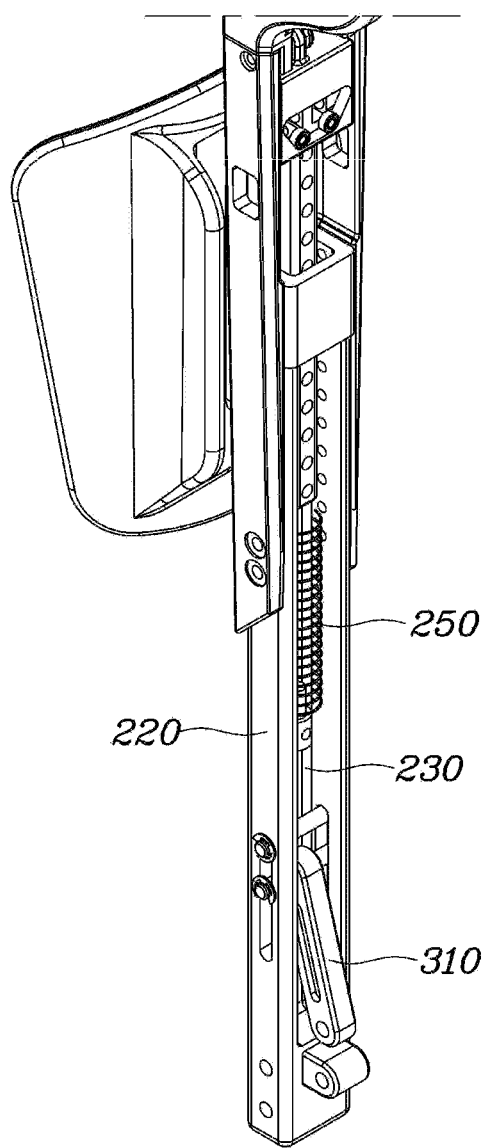
FIG. 8 is a perspective view illustrating a back of the crural link according to the embodiment of the present disclosure.

FIGS. 6A and 6B are perspective views illustrating the state in which the wearable chair according to the embodiment of the present disclosure is unfolded, FIGS. 7A and 7B are perspective views illustrating the state in which the wearable chair according to the embodiment of the present disclosure is folded at the seating angle, and FIG. 8 is a perspective view illustrating the back of the crural link 200 according to the embodiment of the present disclosure.

Referring to FIGS. 6A and 6B to FIG. 8, the device may further include the contact link 300 that is coupled at one end thereof to the lower end of the crural link 200 to be rotatable relative thereto, is rotated about the end in conjunction with the sliding of the sliding part 230 associated with the relative rotation between the femoral link 100 and the crural link 200, and comes into contact with the ground at a position where the other end is spaced apart from the crural link 200 when the wearer wears the device.

One end of the contact link 300 is rotatably coupled to the lower end of the crural link 200, so that the contact link 300 is rotatable around the end coupled to the lower end of the crural link 200 as the rotation axis. Particularly, the contact link 300 is rotated in conjunction with the relative rotation between the femoral link 100 and the crural link 200, so that the other end of the contact link 300 comes into contact with the ground at a position spaced apart from the crural link 200 when the wearer sits.

Thus, when the wearer sits, the center of gravity is stably supported by the contact link 300 that is spaced apart from the wearer's heel to come into contact with the ground when the wearer sits.

The crural link 200 includes the housing 220 that is coupled at the upper end thereof to the lower end of the femoral link 100 to be rotatable relative thereto and is coupled at the lower end thereof to the contact link 300 to be rotatable relative thereto, and the sliding part 230 that is slidably coupled to the housing 220 in a direction in which the housing 220 extends. The sliding part 230 slides in conjunction with the relative rotation between the femoral link 100 and the crural link 200, thus rotating the contact link 300.

Particularly, one end of the contact link 300 is rotatably coupled to the lower end of the housing 220, and the other end of the contact link 300 is fixed to be adjacent to the crural link 200, so that the contact link rotates about one end to come into contact with the ground when the wearer sits.

One end of the contact link 300 is rotatably coupled to the lower end of the housing 220. The device may further include the connection link 310 that is rotatably coupled at one end thereof to the sliding part 230 and is coupled at the other end to a position spaced apart from one end of the contact link 300 coupled to the lower end of the housing 220, and rotates the contact link 300 by the sliding of the sliding part 230.

The other end of the connection link 310 may be coupled to the position spaced apart from one end of the contact link 300 coupled to the lower end of the housing 220. Particularly, the other end of the connection link 310 may be coupled to the position spaced apart from one end of the contact link 300, thus maximizing the rotation of the contact link 300 as the connection link 310 is rotated by the sliding of the sliding part 230 coupled to one end of the connection link 310.

In addition, the device may further include a first elastic body 250 that is positioned between the housing 220 and the sliding part 230 and applies an elastic force to allow the sliding part 230 to slide upwards with respect to the housing 220. Thus, if there is no external force, the sliding part 230 slides upwards by the elastic force, so that the other end of the contact link 300 is fixed to be adjacent to the crural link 200.

As having described, the present disclosure provides a seating support device for a wearable chair, in which the sliding of a sliding part is fixed at a seating angle and the fixing of the sliding part is released without an additional operation when standing up again at the seating angle, thus enabling free walking.

Further, the disclosure is intended to fix sliding at a seating angle and simultaneously to prevent a stopper from being rotated, thus stably supporting a wearer's load at the seating angle.

Moreover, the disclosure is intended to stably support the center of gravity by a contact link that is spaced apart from a wearer's heel to come into contact with the ground when he or she sits.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A seating support device of a wearable chair, comprising:
    a femoral link extending in a direction where a wearer's femoral region extends, and configured to be connected with the wearer's femoral region;
    a crural link extending in a direction where a wearer's crural region extends, and configured to be connected with the wearer's crural region, and including a housing that is coupled at an upper end thereof to a lower end of the femoral link to be rotatable relative thereto, and a sliding part that is slidably coupled to the housing in a direction in which the housing extends;
    a limiting device operated in conjunction with a relative rotation between the femoral link and the crural link to allow the sliding part sliding in the housing to slide up and down, and to prevent sliding between the sliding part and the housing in a state where an angle between the femoral link and the crural link is a seating angle; and
    a contact link coupled at a first end thereof to a lower end of the crural link to be rotatable relative thereto, and operated in conjunction with the sliding of the sliding part associated with the relative rotation between the femoral link and the crural link to be rotated about the first end, a second end coming into contact with a ground while being spaced apart from the crural link when a wearer wears the device.

2. The seating support device according to claim 1, further comprising:
    a stopper engaging with the lower end of the femoral link to rotate integrally with the femoral link; and
    a rotation preventing protrusion provided on the upper end of the crural link to prevent the stopper from being rotated such that an angle between the femoral link and the crural link is less than the seating angle.

3. The seating support device according to claim 2,
    wherein coupling protrusions are formed on the lower end of the femoral link to protrude outwardly at a plurality of angular points in a direction where the femoral link is rotated relative to the crural link, and
    wherein the stopper engages with an associated coupling protrusion to rotate integrally with the femoral link, and changes the seating angle depending on an angular point of the coupling protrusion engaging with the stopper.

4. The seating support device according to claim 1, further comprising:
    a rotary ring coupled to the lower end of the femoral link to be rotatable relative to the femoral link, and coupled with the sliding part to slide the sliding part as the rotary ring rotates; and
    a stopper coupled integrally with the rotary ring, and engaging with the lower end of the femoral link to rotate integrally with the rotary ring and the femoral link.

5. The seating support device according to claim 4,
    wherein coupling protrusions are formed on the lower end of the femoral link to protrude outwardly at a plurality of angular points in a direction where the femoral link is rotated relative to the crural link, and
    wherein the rotary ring is detachably coupled with the stopper, the stopper engages with the coupling protrusion when being integrally coupled with the rotary ring to rotate integrally with the femoral link, and the rotary ring is rotated relative to the femoral link depending on an angular point of the coupling protrusion with which the stopper engages, thus changing the seating angle.

6. The seating support device according to claim 1, wherein the limiting device comprises:
    through holes formed on both sides of the housing surrounding both sides of the sliding part; and
    fixing bodies moved integrally in a sliding direction of the sliding part, and coupled slidably to both sides of the sliding part in the sliding part,
    wherein the fixing bodies slide to both sides of the sliding part to be inserted into the through holes, thus preventing the sliding part from sliding.

7. The seating support device according to claim 6, wherein the limiting device further comprises:
    a cam device positioned above the sliding part, coupled slidably with the sliding part in the sliding direction of the sliding part, and connected to be linearly moved by a rotating motion of the rotary ring,
    the fixing bodies comprise guide protrusions protruding in a direction perpendicular to the sliding direction of the fixing bodies, and the cam device comprises a cam hole to allow the guide protrusions of the fixing bodies to slide a predetermined distance in a vertical direction while being inserted therein, and the cam hole is formed to allow the guide protrusions to come closer to each other if the guide protrusions of the fixing bodies slide downwards.

8. The seating support device according to claim 1, further comprising a transmission link connected at a first end thereof to be associated with the relative rotation between the femoral link and the crural link, and connected at a second end thereof to the sliding part, thus converting a rotating motion associated with the relative rotation between the femoral link and the crural link into a linear motion of the sliding part.

9. The seating support device according to claim 8, further comprising:
- a rotary ring fixed to the lower end of the femoral link to be rotatable integrally with the femoral link;
- an internal gear having on an inner circumference thereof inner teeth, and coupled at a portion or a whole portion thereof with the rotary ring to be rotatable integrally with the rotary ring; and
- an external gear having on an outer circumference thereof outer teeth to mesh with the inner teeth of the internal gear, and coupled to the transmission link to slide the sliding part as the external gear rotates.

10. The seating support device according to claim 1, wherein the first end of the contact link is rotatably coupled to the lower end of the housing, the seating support device further comprising:
- a connection link rotatably coupled at a first end thereof to the sliding part, and coupled at a second end thereof to a position spaced apart from the first end of the contact link coupled to the lower end of the housing, and rotating the contact link by the sliding of the sliding part.

11. The seating support device according to claim 1, wherein the contact link is rotated in conjunction with the relative rotation between the femoral link and the crural link in a rotating section where an angle between the femoral link and the crural link is between a pressing angle obtained by adding the seating angle to a preset interlocking angle and the seating angle, and is fixed in a free section where the angle between the femoral link and the crural link is equal to or more than the pressing angle.

12. The seating support device according to claim 11, further comprising:
- a rotary ring fixed to the lower end of the femoral link to be rotatable integrally with the femoral link;
- an internal gear having on an inner circumference thereof inner teeth, and coupled with the rotary ring in the free section of the femoral link and the crural link to be freely rotated relative thereto, and engaging with the rotary ring in the rotating section of the femoral link and the crural link to be rotated integrally therewith; and
- an external gear having on an outer circumference thereof outer teeth to mesh with the inner teeth of the internal gear, and coupled with the contact link to be rotated in conjunction with the contact link.

13. The seating support device according to claim 12, wherein a number of teeth of the external gear is smaller than a number of teeth of the internal gear to accelerate the rotation of the internal gear.

14. The seating support device according to claim 1, further comprising:
- a first elastic body positioned between the housing and the sliding part and applying an elastic force to allow the sliding part to slide upwards with respect to the housing.

* * * * *